US008472391B2

(12) United States Patent
Earnshaw et al.

(10) Patent No.: US 8,472,391 B2
(45) Date of Patent: Jun. 25, 2013

(54) SYSTEM AND METHOD FOR SEMI-SYNCHRONOUS HYBRID AUTOMATIC REPEAT REQUEST

(75) Inventors: Andrew Mark Earnshaw, Kanata (CA); Yi Yu, Irving, TX (US); Zhijun Cai, Euless, TX (US); Youn Hyoung Heo, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 405 days.

(21) Appl. No.: 12/759,570

(22) Filed: Apr. 13, 2010

(65) Prior Publication Data

US 2010/0260130 A1 Oct. 14, 2010

Related U.S. Application Data

(60) Provisional application No. 61/168,791, filed on Apr. 13, 2009.

(51) Int. Cl.
*H04W 4/00* (2009.01)
(52) U.S. Cl.
USPC ........................................................ 370/329
(58) Field of Classification Search
CPC .............. H04L 1/00; H04L 5/00; H04W 72/00
USPC ................. 370/310, 329, 338, 348, 349, 442, 370/443, 485
See application file for complete search history.

(56) References Cited

U.S. PATENT DOCUMENTS

| 2007/0189206 | A1 | 8/2007 | Chandra et al. |
| 2007/0245201 | A1* | 10/2007 | Sammour et al. ............. 714/748 |
| 2009/0305698 | A1* | 12/2009 | Zhang et al. .................. 455/434 |
| 2010/0115358 | A1* | 5/2010 | Kotecha et al. ............... 714/748 |
| 2011/0085507 | A1* | 4/2011 | Jongren ........................ 370/329 |

FOREIGN PATENT DOCUMENTS

| WO | 2008024340 A2 | 2/2008 |
| WO | 2008054313 A1 | 5/2008 |
| WO | WO2008054313 A1 * | 5/2008 |

OTHER PUBLICATIONS

PCT International Search Report; PCT Application No. PCT/US2010/030927; Oct. 6, 2010; 3 pgs.
PCT Written Opinion of the International Searching Authority; PCT Application No. PCT/US2010/030927; Oct. 6, 2010; 5 pgs.
3GPP TS 36.212 v8.5.0; 3rd Generation Partnership Project; Technical Specification Group Radio Access Network; Evolved Universal Terrestrial Radio Access (E-UTRA); Multiplexing and Channel Coding; Release 8; Dec. 2008; 58 pgs.

(Continued)

*Primary Examiner* — Ricky Ngo
*Assistant Examiner* — Wei-Po Kao
(74) *Attorney, Agent, or Firm* — Conley Rose, P.C.; J. Robert Brown, Jr.

(57) ABSTRACT

A method of Hybrid Automatic Repeat Request (HARQ) retransmission is provided. The method comprises a user equipment (UE) receiving a first transport block associated with a first HARQ process and the UE identifying the first HARQ process based on an implicit parameter related to the first transport block and based on a first signaled HARQ process reference associated with the first transport block.

20 Claims, 10 Drawing Sheets

OTHER PUBLICATIONS

3GPP TS 36.321 v8.4.0; 3rd Generation Partnership Project; Technical Specification Group Radio Access Network; Evolved Universal Terrestrial Radio Access (E-UTRA) Medium Access Control (MAC) Protocol Specification; Release 8; Dec. 2008; 43 pgs.

3GPP TS 36.331 v8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

LG Electronics; 3GPP TSG RAN WG1 #56; Title: HARQ Mapping Across Aggregated Component Carriers; R1-090652; Athens, Greece; Feb. 9-13, 2009; 3 pgs.

McBeath, Sean, et al.; U.S. Appl. No. 12/723,202, filed Mar. 12, 2010; Title: HARQ Process Number Management for Downlink Carrier Aggregation.

McBeath, Sean, et al.; U.S. Appl. No. 12/723,181, filed Mar. 12, 2010; Title: HARQ Process Management for Uplink Carrier Aggregation.

* cited by examiner

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SUBFRAME 0 | 0 | 1 | 2 | 3 | 4 | 5 | 6 | 7 | 8 | 9 | 10 | 11 | 12 | 13 | 14 | 15 |
| SUBFRAME 1 | 0 | 1 | 2 | 3 | 4 | 5 | 6 | 7 | 8 | 9 | 10 | 11 | 12 | 13 | 14 | 15 |
| SUBFRAME 2 | 0 | 1 | 2 | 3 | 4 | 5 | 6 | 7 | 8 | 9 | 10 | 11 | 12 | 13 | 14 | 15 |
| SUBFRAME 3 | 0 | 1 | 2 | 3 | 4 | 5 | 6 | 7 | 8 | 9 | 10 | 11 | 12 | 13 | 14 | 15 |
| SUBFRAME 4 | 0 | 1 | 2 | 3 | 4 | 5 | 6 | 7 | 8 | 9 | 10 | 11 | 12 | 13 | 14 | 15 |
| SUBFRAME 5 | 0 | 1 | 2 | 3 | 4 | 5 | 6 | 7 | 8 | 9 | 10 | 11 | 12 | 13 | 14 | 15 |
| SUBFRAME 6 | 0 | 1 | 2 | 3 | 4 | 5 | 6 | 7 | 8 | 9 | 10 | 11 | 12 | 13 | 14 | 15 |
| SUBFRAME 7 | 0 | 1 | 2 | 3 | 4 | 5 | 6 | 7 | 8 | 9 | 10 | 11 | 12 | 13 | 14 | 15 |
| SUBFRAME 8 | 0 | 1 | 2 | 3 | 4 | 5 | 6 | 7 | 8 | 9 | 10 | 11 | 12 | 13 | 14 | 15 |
| SUBFRAME 9 | 0 | 1 | 2 | 3 | 4 | 5 | 6 | 7 | 8 | 9 | 10 | 11 | 12 | 13 | 14 | 15 |
| SUBFRAME 10 | 0 | 1 | 2 | 3 | 4 | 5 | 6 | 7 | 8 | 9 | 10 | 11 | 12 | 13 | 14 | 15 |
| SUBFRAME 11 | 0 | 1 | 2 | 3 | 4 | 5 | 6 | 7 | 8 | 9 | 10 | 11 | 12 | 13 | 14 | 15 |
| SUBFRAME 12 | 0 | 1 | 2 | 3 | 4 | 5 | 6 | 7 | 8 | 9 | 10 | 11 | 12 | 13 | 14 | 15 |
| SUBFRAME 13 | 0 | 1 | 2 | 3 | 4 | 5 | 6 | 7 | 8 | 9 | 10 | 11 | 12 | 13 | 14 | 15 |

| Subframe | Addressable HARQ Processes | | | | | | | |
|---|---|---|---|---|---|---|---|---|
| 0 | 0 | 1 | 2 | 3 | 4 | 5 | 6 | 7 |
| 1 | 8 | 9 | 10 | 11 | 12 | 13 | 14 | 15 |
| 2 | 0 | 1 | 2 | 3 | 4 | 5 | 6 | 7 |
| 3 | 8 | 9 | 10 | 11 | 12 | 13 | 14 | 15 |

Table 7: Example of alternating banks of addressable HARQ processes between successive subframe numbers

| Subframe | Addressable HARQ Processes | | | | | | | |
|---|---|---|---|---|---|---|---|---|
| 0 | 0 | 1 | 2 | 3 | 4 | 5 | 6 | 7 |
| 1 | 2 | 3 | 4 | 5 | 6 | 7 | 8 | 9 |
| 2 | 4 | 5 | 6 | 7 | 8 | 9 | 10 | 11 |
| 3 | 6 | 7 | 8 | 9 | 10 | 11 | 12 | 13 |
| 4 | 8 | 9 | 10 | 11 | 12 | 13 | 14 | 15 |
| 5 | 10 | 11 | 12 | 13 | 14 | 15 | 0 | 1 |
| 6 | 12 | 13 | 14 | 15 | 0 | 1 | 2 | 3 |
| 7 | 14 | 15 | 0 | 1 | 2 | 3 | 4 | 5 |
| 8 | 0 | 1 | 2 | 3 | 4 | 5 | 6 | 7 |
| 9 | 2 | 3 | 4 | 5 | 6 | 7 | 8 | 9 |
| 10 | 4 | 5 | 6 | 7 | 8 | 9 | 10 | 11 |
| 11 | 6 | 7 | 8 | 9 | 10 | 11 | 12 | 13 |
| 12 | 8 | 9 | 10 | 11 | 12 | 13 | 14 | 15 |
| 13 | 10 | 11 | 12 | 13 | 14 | 15 | 0 | 1 |
| 14 | 12 | 13 | 14 | 15 | 0 | 1 | 2 | 3 |
| 15 | 14 | 15 | 0 | 1 | 2 | 3 | 4 | 5 |

Table 8: Example of a sliding window of addressable HARQ processes between successive subframe numbers

| Subframe | Addressable HARQ Processes | | | | | | | |
|---|---|---|---|---|---|---|---|---|
| 0 | 0 | 1 | 2 | 3 | 4 | 5 | 6 | 7 |
| 1 | 0 | 1 | 4 | 5 | 6 | 7 | 8 | 9 |
| 2 | 0 | 1 | 6 | 7 | 8 | 9 | 10 | 11 |
| 3 | 0 | 1 | 8 | 9 | 10 | 11 | 12 | 13 |
| 4 | 0 | 1 | 10 | 11 | 12 | 13 | 14 | 15 |
| 5 | 0 | 1 | 12 | 13 | 14 | 15 | 2 | 3 |
| 6 | 0 | 1 | 14 | 15 | 2 | 3 | 4 | 5 |
| 7 | 0 | 1 | 2 | 3 | 4 | 5 | 6 | 7 |
| 8 | 0 | 1 | 4 | 5 | 6 | 7 | 8 | 9 |
| 9 | 0 | 1 | 6 | 7 | 8 | 9 | 10 | 11 |
| 10 | 0 | 1 | 8 | 9 | 10 | 11 | 12 | 13 |
| 11 | 0 | 1 | 10 | 11 | 12 | 13 | 14 | 15 |
| 12 | 0 | 1 | 12 | 13 | 14 | 15 | 2 | 3 |
| 13 | 0 | 1 | 14 | 15 | 2 | 3 | 4 | 5 |

Table 9: Example of a mix of asynchronous HARQ processes and a sliding window of semi-synchronous addressable HARQ processes

Figure 11

SYSTEM AND METHOD FOR SEMI-SYNCHRONOUS HYBRID AUTOMATIC REPEAT REQUEST

CROSS-REFERENCE TO RELATED APPLICATIONS

The present application claims priority to U.S. provisional patent application No. 61/168,791 filed Apr. 13, 2009, by Andrew Mark Earnshaw, et al, entitled "System and Method for Semi-Synchronous Hybrid Automatic Repeat Request", which is incorporated by reference herein as if reproduced in its entirety.

BACKGROUND

As used herein, the terms "user equipment" and "UE" can refer to mobile devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" can also refer to devices that have similar capabilities but that are not transportable, such as fixed line telephones, desktop computers, set-top boxes, or network nodes. When a UE is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a communication session for a user. Also, the terms "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) or LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, an LTE or LTE-A eNB, or a router that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a diagram of an example of alternating banks of addressable HARQ processes between successive subframe numbers, according to an embodiment of the disclosure.

FIG. 7 is a diagram of an example of a sliding window of addressable HARQ processes between successive subframe numbers, according to an embodiment of the disclosure.

FIG. 8 is a diagram of an example of a mix of asynchronous HARQ processes with a sliding window of semi-synchronous addressable HARQ processes, according to an embodiment of the disclosure.

FIG. 9 is a diagram of an example of HARQ processes with a mix of varying repetition patterns, according to an embodiment of the disclosure.

FIG. 10 is a diagram of an example of resource element groups occupied by a compact DCI versus a long DCI on the PDCCH, according to an embodiment of the disclosure.

FIG. 11 contains tables of examples of HARQ processes, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases it is desirable for an access device to transmit a large amount of data to a UE in a short amount of time. For instance, a video broadcast may include large amounts of audio and video data that have to be transmitted to a UE over a short amount of time. As another instance, a UE may run several applications that all have to transmit data packets to an access device essentially simultaneously so that the combined data transfer is extremely large. One way to increase the rate of data transmission is to use multiple component carriers (CC), e.g., multiple carrier frequencies instead of a single CC to communicate between an access device and the UEs.

LTE-A is a mobile communication standard that is currently being designed by the 3rd Generation Partnership Project (3GPP) as a major enhancement of LTE. In LTE-A, the access device and the UE may communicate user data and control data using a plurality of CCs. The CCs may be distributed about equally over a predetermined combined bandwidth, e.g., each CC may comprise about an equal portion of the combined bandwidth. When transmission errors occur, the data may be retransmitted using a Hybrid Automatic Repeat Request (HARQ) process. Accordingly, additional error detection and correction bits may be added to the transmitted data. If the recipient of the transmitted data is able to successfully decode the data block, then the recipient may accept the data block and may send an acknowledgement (ACK) to the transmitter. If the recipient is not able to decode the data block, the recipient may then request a retransmission of the data by sending a negative acknowledgement (NACK) to the transmitter.

Figure 1:
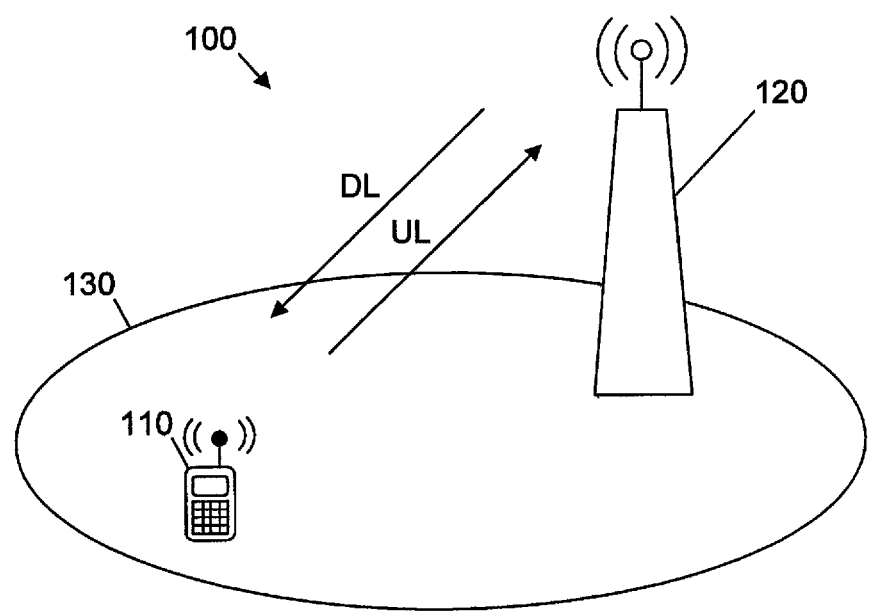
FIG. 1 is a diagram of an embodiment of a wireless communication system according to an embodiment of the disclosure.

FIG. 1 illustrates an embodiment of a wireless communication system 100. FIG. 1 is exemplary and may have other components or arrangements in other embodiments. The wireless communication system 100 may comprise at least one UE 110 and an access device 120. In some contexts, the access device 120 may be referred to as an access node (AN). The UE 110 may wirelessly communicate, via a wireless link, with the network access device 120. The wireless link may conform to any of a plurality of telecommunications standards or initiatives, such as those described in the 3GPP, including LTE, LTE-Advanced, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including interim Standard 95 (IS-95), Code Division Multiple Access (CDMA) 2000 standards 1xRTT or 1xEV-DO. The wireless link may also be compatible with other standards, such as those described by the Institute of Electrical and Electronics Engineers (IEEE), or other industry forums, such as the WiMAX forum.

The access device 120 may be an eNB, a base station, or other components that promote network access for the UE 110. The access device 120 may communicate with any UE 110, which may be within the same cell 130, directly via a direct link, or indirectly (e.g., via an RF repeater). For instance, the direct link may be a point-to-point link established between the access device 120 and the UE 110 and used to transmit and receive signals between the two. The UE 110 may also communicate with at least a second UE 110 within the same cell. Additionally, the access device 120 may also communicate with other components or devices (not shown) to provide those other components of the wireless communication system 100 access to other networks.

The UE 110 and the access device 120 may wirelessly communicate via at least one downlink (DL) channel, at least one uplink (UL) channel, or both. The downlink and uplink channels may be physical channels, which may be statically, semi-statically, or dynamically allocated network resources. For instance, the downlink and uplink channels may comprise at least one physical downlink shared channel (PDSCH), at least one physical downlink control channel (PDCCH), at least one physical uplink shared channel (PUSCH), at least one physical uplink control channel (PUCCH), or combinations thereof. In an embodiment, the downlink and uplink channels may be established using frequency-division duplexing (FDD), where signals are received and transmitted at different frequencies. Additionally or alternatively, the downlink and uplink channels may be established using time-division duplexing (TDD) on the same frequency, where the signals may be transmitted or received at different transmission time intervals (TTIs).

In an embodiment, the access device 120 may transmit user data, such as voice, video, or other communication data, to the UE 110 over a DL, such as the PDSCH. The access device 120 may also transmit control data, such as resource allocation and hybrid automatic repeat request (HARQ) control data, to the UE over the PDCCH. For example, the access device 120 may transmit a downlink control information (DCI) parameter over the PDCCH. In an embodiment, the DCI may contain information that identifies, at least in part, a downlink HARQ process. In an embodiment, the DCI may contain information that identifies, at least in part, an uplink HARQ process. The access device 120 may receive from the UE 110 user data over an UL, such as the PUSCH, control data over the PUCCH, or both. The wireless communication system 100, may support the LTE-A standard, where the user data and control data may be transported using a plurality of CCs that extend a predetermined bandwidth. For example, the user data and control data may be transmitted using about five CCs, which may be distributed about equally over a total combined bandwidth of about 100 mega Hertz (MHz), e.g., each CC may comprise a bandwidth of about 20 mega Hertz (MHz). The user data and control data may also be transported over each CC using the 3GPP Release 8 (R8) standard. As such, the data may be received over a single CC using the R8 standard or over multiple CCs using the LTE-A standard.

In an embodiment, the access device 120 may transmit the user data over the DL and/or control data over the PDCCH using a semi-static configuration. Accordingly, at least one CC may be assigned to the user data at some time intervals, which may be greater than about a duration of a sub-frame, e.g., about one millisecond. For example, the time delays between switching or reassigning the CCs over the DL may be equal to about a few seconds or minutes. The time intervals of the semi-static configuration may be larger than the time intervals used in a dynamic configuration, which may be on the order of a duration of a sub-frame or equal to about one millisecond. As such, the CCs may be assigned or switched less frequently using the semi-static configuration, which may reduce the procedure complexity, reduce communications and hence power consumption, or both.

In an embodiment, more than eight HARQ processes may be associated with a single UE 110. For example, in the case that multiple CC communication is employed for communication between the UE 110 and the access device 120, sixteen HARQ processes may be associated with the UE 110. In an embodiment, an integral multiple of eight HARQ processes may be associated with the UE 110, for example sixteen HARQ processes, twenty-four HARQ processes, thirty-two HARQ processes, forty HARQ processes, forty-eight HARQ processes, fifty-six HARQ processes, sixty-four HARQ processes, seventy-two HARQ processes, eighty HARQ processes, or some other integer multiple of eight HARQ processes may be associated with the UE 110. In another embodiment, some other number of HARQ processes greater than eight may be employed, including a number that is not an integer multiple of eight.

In an embodiment, the downlink HARQ process may be identified by a combination of an explicit parameter signaled by the access device 120 and an implicit parameter associated with the downlink communication. For example, the explicit parameter in an embodiment may comprise at least a portion of the DCI and the implicit parameter may comprise the subframe number (or a function of the subframe number, for example a modulus operation performed on the subframe number) associated with a downlink transport block and/or a downlink data transmission. In some contexts, identifying the downlink HARQ process based in part on the explicit parameter signaled by the access device 120 and based in part on an implicit parameter may be referred to as semi-synchronous HARQ. In some contexts, the explicit parameter may be referred to as a signaled HARQ process reference. In an embodiment, a mapping of HARQ process identity versus the implicit parameter and the explicit parameter may be stored in a memory of the UE 110. In an embodiment, the access device 120 may transmit the mapping of HARQ process identity to the UE 110, and the UE 110 may store the mapping in a memory of the UE 110. In an embodiment, the access device 120 may transmit different mappings of HARQ process identities to different UEs 110.

Table 1 below illustrates a first exemplary mapping of HARQ process identities that repeats every two subframes.

TABLE 1

|      | DCI 000 | DCI 001 | DCI 010 | DCI 011 | DCI 100 | DCI 101 | DCI 110 | DCI 111 |
|------|---------|---------|---------|---------|---------|---------|---------|---------|
| SF 0 | 0       | 1       | 2       | 3       | 4       | 5       | 6       | 7       |
| SF 1 | 8       | 9       | 10      | 11      | 12      | 13      | 14      | 15      |

Table 1 maps a subframe number (modulo 2) and a DCI-signalled value to a unique HARQ process identifier from 0 to 15. For example, a DCI 000 binary value combined with a subframe 0 maps to a HARQ process identifier 0; a DCI 011 binary value combined with a subframe 1 maps to a HARQ process identifier 11.

Table 2 below illustrates a second exemplary mapping of HARQ process identities that repeats every four subframes.

TABLE 2

|      | DCI 000 | DCI 001 | DCI 010 | DCI 011 | DCI 100 | DCI 101 | DCI 110 | DCI 111 |
|------|---------|---------|---------|---------|---------|---------|---------|---------|
| SF 0 | 0       | 1       | 2       | 3       | 4       | 5       | 6       | 7       |
| SF 1 | 8       | 9       | 10      | 11      | 4       | 5       | 6       | 7       |
| SF 2 | 8       | 9       | 10      | 11      | 12      | 13      | 14      | 15      |
| SF 3 | 0       | 1       | 2       | 3       | 12      | 13      | 14      | 15      |

Table 3 below illustrates a third exemplary mapping of HARQ process identities that repeats every eight subframes.

TABLE 3

|      | DCI 000 | DCI 001 | DCI 010 | DCI 011 | DCI 100 | DCI 101 | DCI 110 | DCI 111 |
|------|---------|---------|---------|---------|---------|---------|---------|---------|
| SF 0 | 0       | 1       | 2       | 3       | 4       | 5       | 6       | 7       |
| SF 1 | 8       | 9       | 2       | 3       | 4       | 5       | 6       | 7       |
| SF 2 | 8       | 9       | 10      | 11      | 4       | 5       | 6       | 7       |
| SF 3 | 8       | 9       | 10      | 11      | 12      | 13      | 6       | 7       |
| SF 4 | 8       | 9       | 10      | 11      | 12      | 13      | 14      | 15      |
| SF 5 | 0       | 1       | 10      | 11      | 12      | 13      | 14      | 15      |
| SF 6 | 0       | 1       | 2       | 3       | 12      | 13      | 14      | 15      |
| SF 7 | 0       | 1       | 2       | 3       | 4       | 5       | 14      | 15      |

Table 4 below illustrates a fourth exemplary mapping of HARQ process identities that repeats every seven subframes.

TABLE 4

|      | DCI 000 | DCI 001 | DCI 010 | DCI 011 | DCI 100 | DCI 101 | DCI 110 | DCI 111 |
|------|---------|---------|---------|---------|---------|---------|---------|---------|
| SF 0 | 0       | 1       | 2       | 3       | 4       | 5       | 6       | 7       |
| SF 1 | 0       | 1       | 8       | 9       | 4       | 5       | 6       | 7       |
| SF 2 | 0       | 1       | 8       | 9       | 10      | 11      | 6       | 7       |
| SF 3 | 0       | 1       | 8       | 9       | 10      | 11      | 12      | 13      |
| SF 4 | 0       | 1       | 14      | 15      | 10      | 11      | 12      | 13      |
| SF 5 | 0       | 1       | 2       | 3       | 14      | 15      | 12      | 13      |
| SF 6 | 0       | 1       | 2       | 3       | 4       | 5       | 14      | 15      |

Table 4 combines both semi-synchronous and asynchronous HARQ process identification techniques. (Asynchronous HARQ process identification implies that the HARQ process is addressable in every subframe.) For example, a DCI-signalled value of 000 binary asynchronously identifies the HARQ process identity 0, and a DCI-signalled value of 001 binary asynchronously identifies the HARQ process identity 1. The remaining DCI-signalled values are combined with the subframe value to uniquely identify the HARQ process identity and hence are partly synchronous and partly asynchronous, hence semi-synchronous.

Table 5 below illustrates a fifth exemplary mapping of HARQ process identities that repeats every six subframes.

TABLE 5

|      | DCI 000 | DCI 001 | DCI 010 | DCI 011 | DCI 100 | DCI 101 | DCI 110 | DCI 111 |
|------|---------|---------|---------|---------|---------|---------|---------|---------|
| SF 0 | 0       | 1       | 2       | 3       | 6       | 7       | 8       | 9       |
| SF 1 | 0       | 1       | 4       | 5       | 10      | 11      | 12      | 13      |
| SF 2 | 0       | 1       | 2       | 3       | 14      | 15      | 16      | 17      |
| SF 3 | 0       | 1       | 4       | 5       | 6       | 7       | 8       | 9       |
| SF 4 | 0       | 1       | 2       | 3       | 10      | 11      | 12      | 13      |
| SF 5 | 0       | 1       | 4       | 5       | 14      | 15      | 16      | 17      |

Table 5 also combines asynchronous and synchronous mapping of HARQ identities. Additionally, Table 5 illustrates a mapping that promotes different periodicity or duty cycles for different HARQ identities. For example, HARQ identities 0 and 1 are available in every subframe, a 100% duty cycle; HARQ identities 2, 3, 4, and 5 are available every other subframe, a 50% duty cycle; and HARQ identities 6 through 17 are available every third subframe, a 33.333% duty cycle.

In combination with the present disclosure, one of ordinary skill in the art may readily extend the HARQ process mappings illustrated in Tables 1 through 5 to achieve other duty cycles and/or combinations of asynchronous and synchronous mapping of HARQ identities and/or other numbers of HARQ process identities. The HARQ process mappings may be applied by transforming a subframe sequence number using a modulus operation. For example, any subframe sequence number may be used to index into Table 1 by transforming the subframe sequence number by modulus 2. For example, subframe sequence number 125 MOD 2=1; subframe sequence number 126 MOD 2=0. Similarly, any subframe sequence number may be used to index into Table 2 by transforming the subframe sequence number by modulus 4. Similarly, any subframe sequence number may be used to index into Table 3 based on modulus 8, into Table 4 based on modulus 7, and into Table 5 based on modulus 6. Note that while a DCI of three bits is illustrated in the tables above, the approach of combining synchronous and asynchronous techniques for HARQ process identification is also applicable to a DCI of two bits, a DCI of four bits, and a DCI of another number of bits. For example, a DCI comprising two bits may be used to map eight HARQ process identities as illustrated in Table 6 below.

TABLE 6

|      | DCI 00 | DCI 01 | DCI 10 | DCI 11 |
|------|--------|--------|--------|--------|
| SF 0 | 0      | 1      | 2      | 3      |
| SF 1 | 4      | 5      | 6      | 7      |

While described above with reference to the UE 110 identifying a HARQ process associated with a downlink data transmission, the concepts of the present disclosure are applicable to the access node 120 identifying a HARQ process associated with an uplink data transmission.

Figure 2:
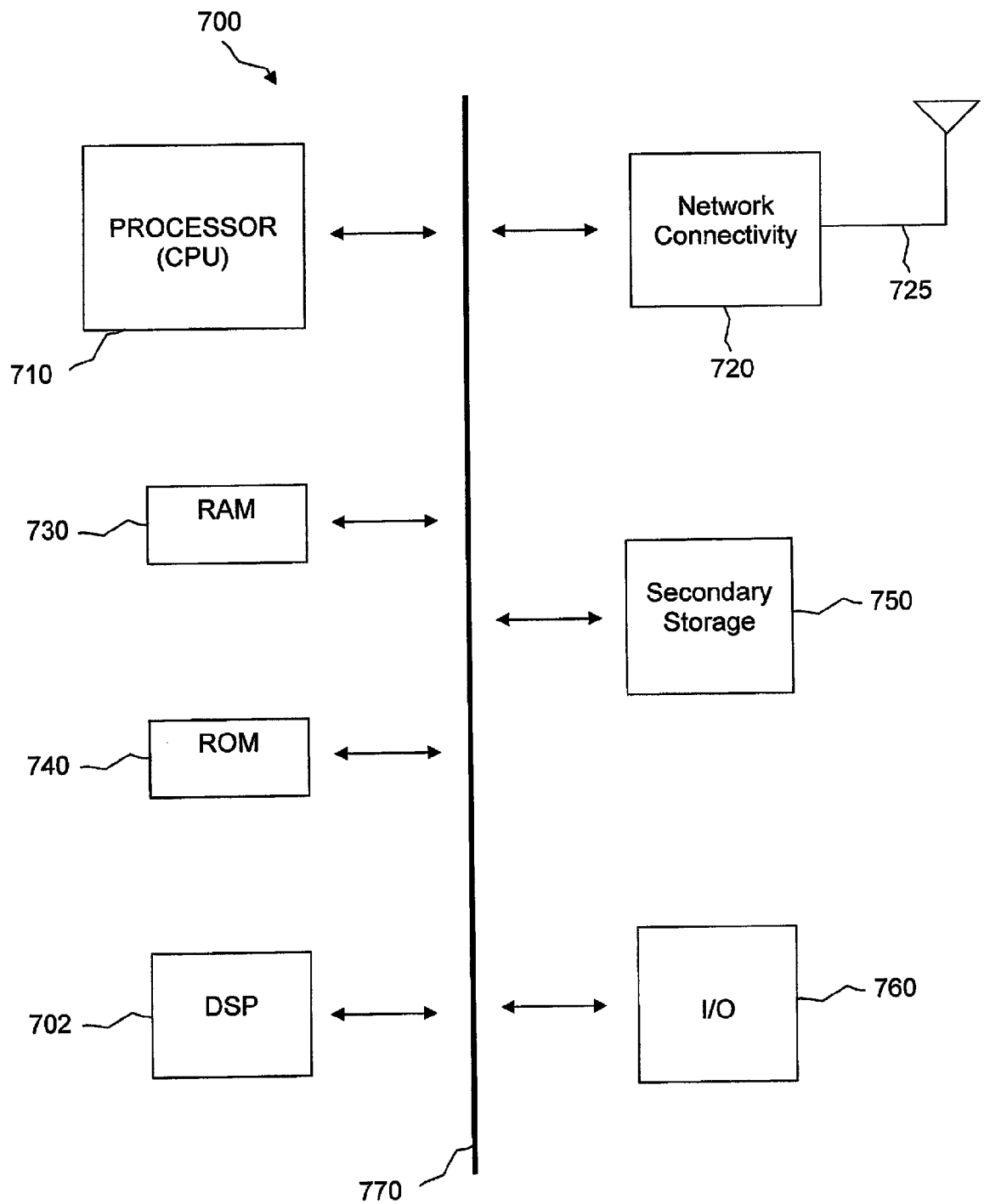
FIG. 2 illustrates a processor and related components suitable for implementing the several embodiments of the present disclosure.

The UE 110 and other components described above might include a processing component that is capable of executing instructions related to the actions described above. FIG. 2 illustrates an example of a system 700 that includes a processing component 710 suitable for implementing one or more embodiments disclosed herein. In addition to the processor 710 (which may be referred to as a central processing unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a DSP 702. Although the DSP 702 is shown as a separate component, the DSP 702 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input and output devices. Also, the transceiver 725 might be considered to be a component of the I/O devices 760 instead of or in addition to being a component of the network connectivity devices 720.

The following are incorporated herein by reference for all purposes: 3GPP TS 36.212, 3GPP TS 36.321, 3GPP TS 36.331, 3GPP TS 36.814, and R1-090652.

Additional embodiments and disclosure are now provided.

Figure 3:
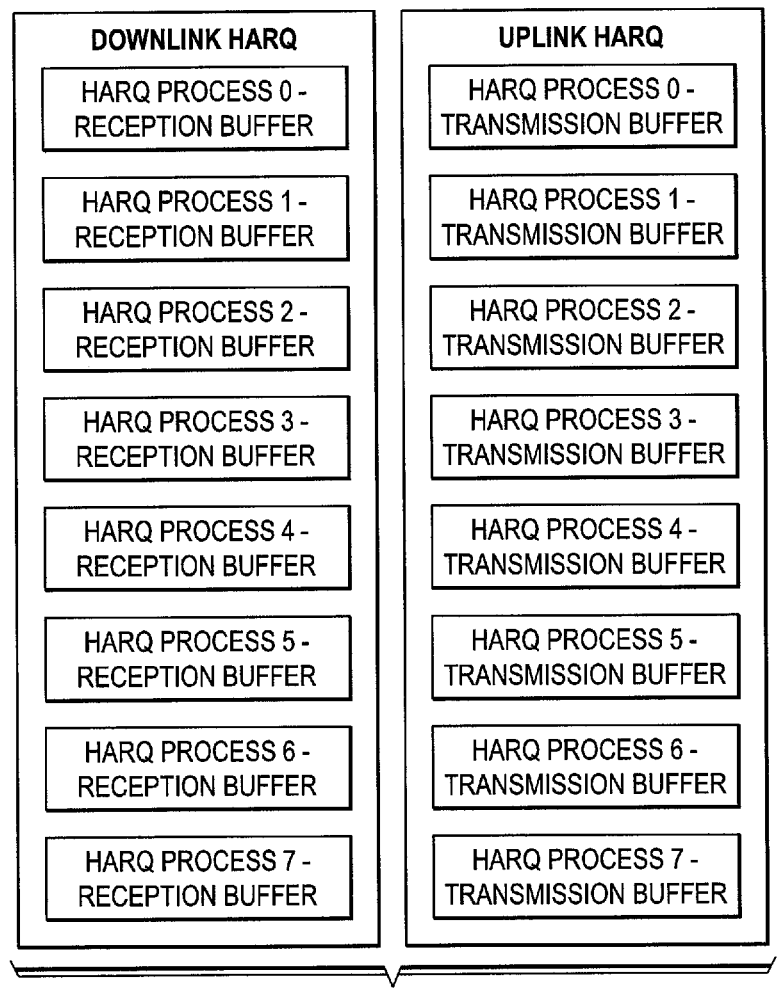
FIG. 3 is a diagram of HARQ processes for the downlink (with reception buffers) and the uplink (with transmission buffers), according to an embodiment of the disclosure.

LTE uses two forms of HARQ, depending upon the link direction. Each link direction contains eight HARQ processes, which either contain a soft-combining reception buffer (downlink) or a transmission buffer (uplink), as illustrated in FIG. 3. In the event of an HARQ retransmission being performed, the additional received data can be combined with previously received data (downlink), or the previously transmitted data can be retrieved from the appropriate HARQ process's transmission buffer for HARQ retransmission (uplink). Each HARQ process only handles one set of data at once (which may consist of one or two physical layer transport blocks, depending upon the MIMO mode being used). That is, a DL HARQ process continues receiving coded bits corresponding to the same original information bits until either the coded data is successfully decoded or further DL HARQ retransmissions of that data by the access node are abandoned. At this point, that particular DL HARQ process can be reused for new data. Similarly, an UL HARQ process continues retransmitting the same original information bits until either the access node successfully decodes the received data or further UL HARQ retransmissions of that information by the UE are abandoned.

Downlink HARQ processes are specified asynchronously in LTE. Each downlink transmission allocation (as specified by a DCI on the PDCCH) is explicitly associated with a particular DL HARQ process that is signaled within the DCI. Since eight DL HARQ processes are available, three bits are required within the DCI to specify the DL HARQ process to which the received data should be directed. The use of asynchronous HARQ allows a downlink transmission to be directed to any of the eight DL HARQ processes in any of the subframes.

Figure 4:
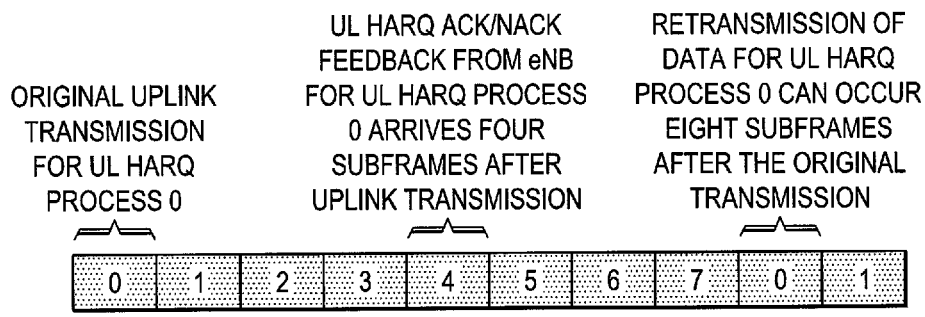
FIG. 4 is a diagram of synchronous HARQ operation for the LTE uplink, according to an embodiment of the disclosure.

Conversely, uplink HARQ processes are specified synchronously in LTE. Each uplink transmission allocation (as specified by a DCI 0 on the PDCCH) is implicitly associated with a particular UL HARQ process that is a function of the current subframe number. On the uplink, no over-the-air signaling of the UL HARQ process number is performed. Instead, the UE simply cycles through the available eight UL HARQ processes in turn (one per subframe) and then loops back to the beginning. This is illustrated in FIG. 4, where the eight UL HARQ processes are dealt with in turn. One result of this is that UL HARQ retransmissions can only occur every eighth subframe. Consequently, the LTE UL HARQ design is slightly less flexible than the LTE DL HARQ design, since specific UL HARQ processes can only be accessed at specific points in time. The rapid HARQ feedback in LTE and the use of only one HARQ process per subframe result in eight HARQ processes being sufficient to meet the data transmission needs of LTE.

One of the intended goals of LTE-A is to achieve potentially higher data rates and throughputs than LTE. One technique for accomplishing this is the use of multi-carrier aggregation, where downlink and/or uplink transmissions can occur on multiple carriers. Here, a UE may receive (or transmit) information to (or from) more than one HARQ process per subframe, as a result of simultaneous downlink (or uplink) transmissions on multiple carriers. This is a key difference from LTE, where only one HARQ process was required within each subframe.

As a result of the above expansion, eight HARQ processes will not be sufficient to meet the increased data handling requirements of LTE-A. Additional HARQ processes on both the downlink and uplink are expected to be required to accommodate cases where a UE receives or transmits data on multiple carriers during the same subframe. At the same time, there also may be a preference to maintain (wherever possible) the current DCI formats on the PDCCH in order to maximize backwards compatibility. This implies that it may be desirable to retain the three bits used for HARQ process signaling on the downlink.

Two options have previously been proposed for increasing the number of HARQ processes within LTE-A. One option treats each LTE-A carrier separately, with each carrier having the usual number of eight HARQ processes. This essentially locks the HARQ processes of a particular carrier to that carrier. As a result, HARQ retransmissions for a given HARQ process may only be scheduled on that same carrier, which potentially limits scheduling flexibility, carrier diversity, etc. The advantage of this approach is that the same DCI formats can be retained since only three bits are required to uniquely address each HARQ process.

Another option increases the total number of HARQ processes (e.g., by a factor of n, where n is the number of active LTE-A carriers), and allows these HARQ processes to be shared across all of the active carriers. This results in full scheduling flexibility, since a HARQ retransmission can be performed on a different carrier from the one on which the previous HARQ transmission was made. However, more than three bits may be required in order to uniquely address each HARQ process, and modifications to the existing DCI formats may therefore be required.

The problem described above has previously been addressed by proposing that some DL HARQ process numbers are associated with a specific LTE-A carrier while other DL HARQ process numbers are shared across all of the active carriers. These latter shared DL HARQ processes may be used for retransmissions on any of the active carriers, whereas retransmissions for the dedicated DL HARQ processes can only occur on the same carrier as that on which the previous transmission occurred. One advantage of this solution is that the current DCI formats can be retained since only three bits continue to be required for indicating a specific DL HARQ process. However, this solution may constrain retransmission scheduling, particularly for the DL HARQ processes that are dedicated to a specific carrier since retransmissions cannot be switched to a different carrier. In addition, the presence of two different types of DL HARQ processes (i.e., shared and dedicated) will likely increase scheduler complexity. Finally, if the number of shared DL HARQ processes becomes too large, then the total number of available DL HARQ processes may drop below the required level for effective operation (e.g., if all of the DL HARQ processes are shared, then only eight DL HARQ processes will be available in total).

The uplink HARQ situation has been addressed by proposing HARQ sub-entities, each of which would contain eight UL HARQ processes. A particular UL HARQ process would be indicated as a combination of a signaled component (i.e., the HARQ sub-entity index) and a non-signaled component (i.e., the HARQ process number within the signaled HARQ sub-entity—this quantity would be obtained in a synchronous fashion (see FIG. 4)).

Some differences between these previous proposals and the embodiments described herein include the following. Previous proposals address the uplink scenario, whereas the present embodiments could be applicable to the downlink and to the uplink. Another difference lies in the DCI formats. Previous proposals might require a modification to DCI 0 (uplink allocations) to include the HARQ sub-entity index, while the present embodiments require no modifications to the downlink DCI formats. Also, in previous proposals, a particular HARQ process is only available once every eight subframes. The present embodiments allow a particular HARQ process to be accessed multiple times within such a window of subframes, which should permit greater scheduling flexibility.

Figure 5:
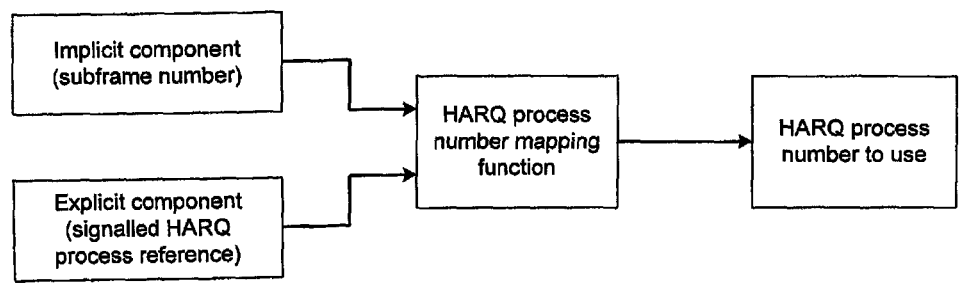
FIG. 5 is a diagram of HARQ process number determination in semi-synchronous HARQ, according to an embodiment of the disclosure.

In an embodiment, semi-synchronous HARQ process signaling is one possible approach for increasing the total number of available HARQ processes in LTE-A, while not needing to increase the number of signaling bits on the downlink that specify to which DL HARQ process a particular transmission should be directed. In semi-synchronous HARQ, the selected DL HARQ process is determined via a combination of the current subframe number (which is implicitly known at both the transmitter and receiver) and the signaled DL HARQ process reference (which is sent over-the-air). Subframe indices essentially cycle from 0 to 9 within each radio frame. A different periodicity may be required within the context of this approach, so the term "subframe number" as used herein refers to a combination of the current frame number and the subframe index within each radio frame. FIG. 5 illustrates this procedure, where an implicit and an explicit component both feed into a mapping function whose output is the number of the HARQ process that should be used.

Essentially, only eight DL HARQ processes are immediately addressable within any given subframe, although these eight DL HARQ processes are available across all of the active LTE-A carriers. However, the group of addressable (and hence available) DL HARQ processes changes from one subframe to another. One advantage of this approach is that no change is required to the number of DL HARQ process signaling bits within the LTE DCI formats. Additionally, semi-synchronous HARQ could be useful when a compact form of signaling grant information on the PDCCH is desired (e.g., a special compact DCI) by reducing the number of bits required for specifying a particular HARQ process. The cost involves possible slight additional latency (e.g., 1 ms) before a particular DL HARQ process is addressable and a potential increase in access node scheduler complexity.

Although the above paragraphs refer specifically to DL HARQ, the present embodiments are equally applicable to UL HARQ as well. However, semi-synchronous HARQ operation on the uplink might require modification to the current DCI 0 format or else the definition of a new DCI format for uplink grant signaling, since no UL HARQ process number information is explicitly signaled in the current LTE design. Semi-synchronous HARQ might require some HARQ process number information to be signaled over-the-air.

One point that is exploited by the present embodiments is that not all of the available HARQ processes necessarily need to be immediately addressable within all subframes. In addition, a differentiator of the present embodiments is that the mapping of signaled HARQ process reference to actual HARQ process number can change from one subframe to another (as influenced by the implicit component input shown in FIG. 5).

The examples given below contain a total of sixteen individual HARQ processes. It should be noted that this total number is used for illustrative purposes only, and the proposed design can be easily adapted to include a larger number of HARQ processes (e.g. 24 or 32).

Figure 6:
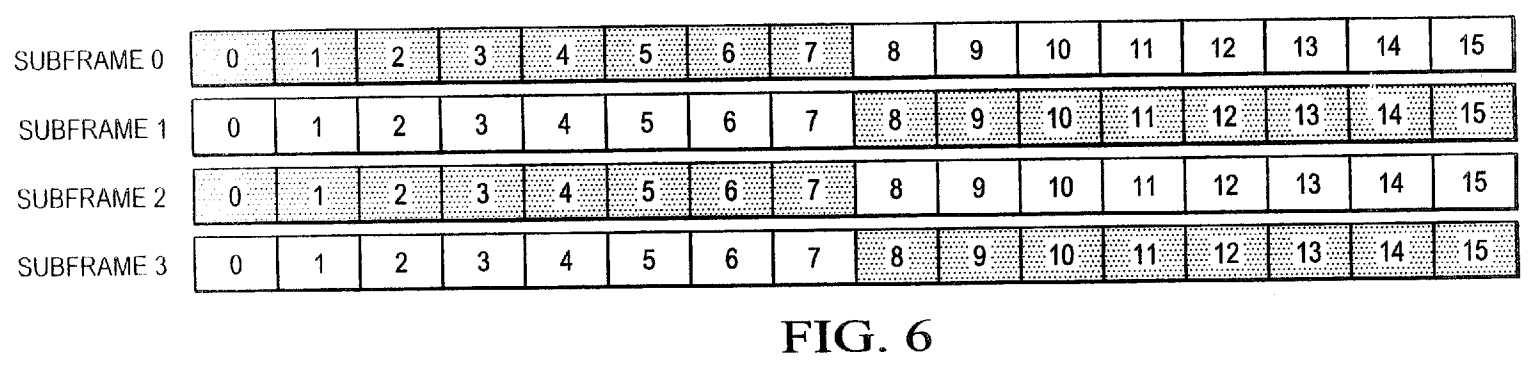

Table 7 of FIG. 11 illustrates one example of semi-synchronous HARQ, where the subframe number is used to select one of two alternating banks of DL HARQ processes. The first bank (processes 0-7) is selected during even subframes, and the second bank (processes 8-15) is selected during odd subframes. An additional delay of 1 ms may be incurred when scheduling a retransmission (since the desired HARQ process may not be available in the current subframe and the access node scheduler may therefore have to wait for the next subframe). This example design is also illustrated in FIG. 6, where the shaded boxes represent the HARQ processes that are available during each indicated subframe.

Figure 7:
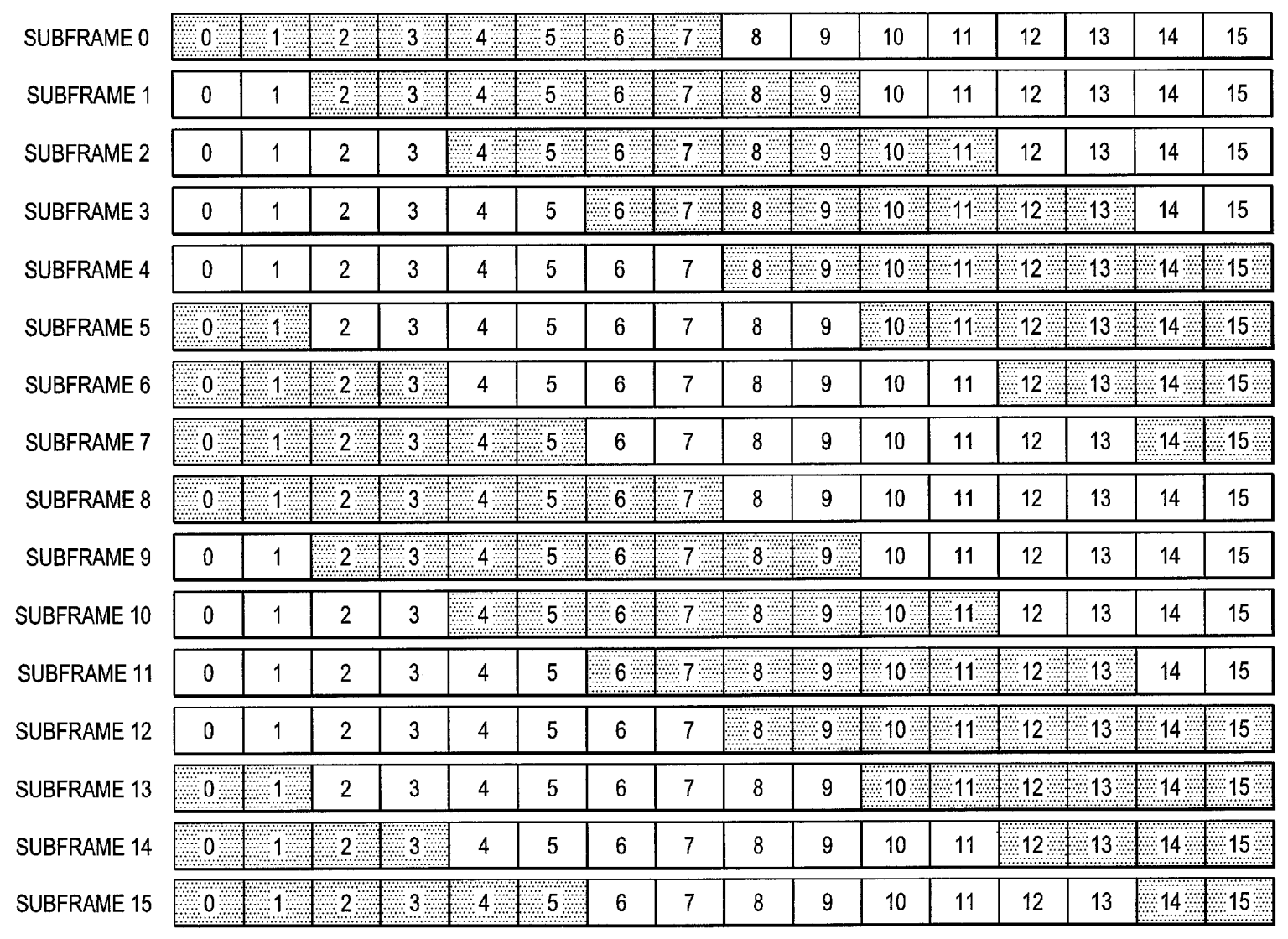

Table 8 of FIG. 11 illustrates another example of a potential semi-synchronous HARQ configuration, where a sliding window is used to determine which HARQ processes are addressable within a particular subframe. This is also illustrated in FIG. 7, where the shaded boxes represent the HARQ processes that are available during each indicated subframe. This configuration takes advantage of the fact that there will be a certain minimum required time period (e.g., to allow for UE processing and HARQ ACK/NACK feedback) between successive HARQ retransmissions to a given HARQ process. As an example, consider a HARQ transmission made to HARQ process 6 during subframe 0. In the event of a HARQ NACK, a HARQ retransmission could be made to the same HARQ process any time during subframes 8 through 11. This would allow sufficient flexibility (i.e., a sufficiently long window of opportunity) for the access node scheduler to arrange the retransmission.

Other semi-synchronous HARQ configurations (i.e., HARQ process number mapping functions) are, of course, possible and should not be considered to be limited just to the two examples presented above. The particular configuration in use could be configured semi-statically (via RRC signaling) in order to retain flexibility.

Different UEs within the same cell could be configured either with the same or with different semi-synchronous HARQ process number mapping functions. The HARQ process availability pattern corresponding to the configured mapping function for a given UE may depend on the selected Quality of Service (QoS) requirements for that UE's traffic. In addition, for a particular UE, if resource allocation information (i.e., DCIs) can arrive on different PDCCHs (e.g., on a separate PDCCH for each active LTE-A carrier), then a different semi-synchronous HARQ process number mapping function could even be configured for each PDCCH received by that UE.

In order to provide different HARQ processes with varying QoS levels, it may be desirable to configure different HARQ processes to be fully asynchronous (i.e., addressable in any subframe) or semi-synchronous (i.e., addressable only in certain subframes). FIG. 8 and Table 9 of FIG. 11 provide an example of this, where two HARQ processes (0 and 1) are completely asynchronous and are thus addressable in any subframe. The remaining 14 HARQ processes in this example (2 through 15) are semi-synchronously addressable only in certain subframes via a sliding window (of length 6).

Figure 9:
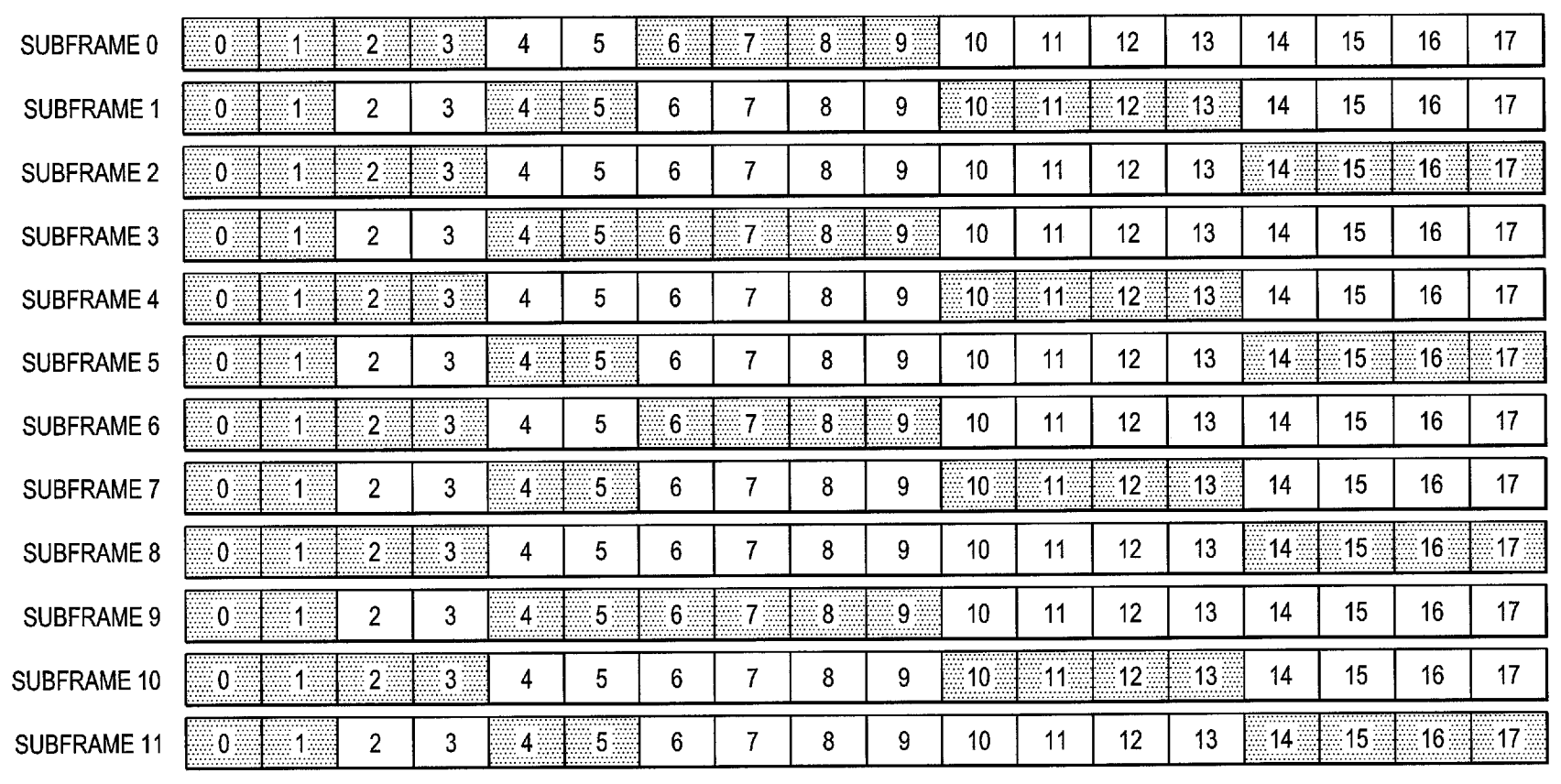

An extension of this idea allows certain HARQ processes to be configured with different cycle times as to when they were addressable. An example of this is shown in FIG. 9 where two HARQ processes (0 and 1) are addressable in every subframe, four HARQ processes (2 through 5) are addressable in every second subframe, and twelve HARQ processes (6 through 17) are addressable in every third subframe. It should be noted that the number of asynchronous versus semi-synchronous HARQ processes would be configurable and is not limited just to the values corresponding to the examples given herein.

Another approach that could be used to provide a mix of semi-synchronous and asynchronous HARQ functionality would be to have multiple DCI formats capable of specifying HARQ processes with each DCI format using one of the available addressing modes. For example, a semi-synchronous DCI could normally be used to specify the HARQ process to be used via a semi-synchronous mapping function and a small number of process number signaling bits (e.g., 3). If a HARQ retransmission must be performed, the scheduler would have the choice of either waiting for a subframe where the desired HARQ process is semi-synchronously addressable (note that the desired HARQ process may be semi-synchronously addressable in the current subframe, in which case no waiting would be required) or else using a different DCI with a larger number of signaling bits that allow the HARQ process to be specified asynchronously. This latter DCI would allow any HARQ process to be directly addressable in any subframe. The UE would attempt to decode both DCI formats on the PDCCH in order to recover the grant and HARQ process information provided by the access node.

Figure 10:
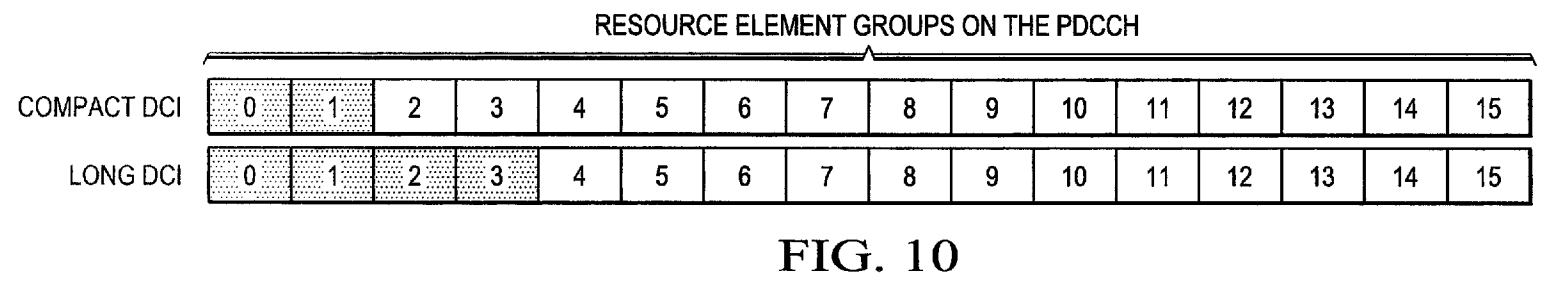

As mentioned earlier, one possible use of this approach would be in the definition of a compact DCI format that allows a particular resource grant to be specified using a smaller number of signaling bits. For example, a HARQ process could be semi-synchronously specified using only three bits, whereas asynchronous HARQ process specification might require five bits. Other grant information (e.g., which resource blocks to use, which carriers to use, etc.) would also be specified in a compact fashion with fewer bits so that the compact DCI would have a noticeably shorter length than the other DCI, which would contain more signaling bits. DCIs are encoded on the PDCCH using a certain number of Resource Element Groups (REGs)—2, 4, or 8. The number of REGs selected to encode a DCI depends on a number of factors, including a UE's current channel conditions and the desired probability of decoding success. For a given number of REGs, a long DCI that is twice the length of a compact DCI will have an effective code rate approximately half that of the compact DCI, which would lead to a lower probability of decoding success. Hence, the use of a compact DCI could lead to more efficient use of the PDCCH resources. An example of this is illustrated in FIG. 10, where the compact DCI consumes only two REGs on the PDCCH, while the long DCI consumes twice as many REGs. Note that the more REGs that are used by the PDCCH, the fewer transmission resources that are available for other purposes (e.g., data transmission on the PDSCH).

For semi-persistent scheduling on the downlink, a configurable number of HARQ processes may be reserved for SPS use. The index of the DL SPS HARQ process to use for a particular subframe may currently be calculated as:

HARQ Process ID=[floor(CURRENT_*TTI*/(Downlink Semi-Persistent Scheduling Interval))] modulo Number of Configured SPS Processes where CURRENT_TTI=[(SFN*10)+subframe number]. This equation was designed to ensure that the HARQ processes used for DL SPS do not overlap between successive transmissions of new data. For example, if three HARQ processes are reserved for DL SPS operation, then the HARQ process indices used for new data transmissions would cycle through 0, 1, 2, 0, 1, 2, etc. This pattern ensures that any HARQ retransmissions for a given DL SPS HARQ process can be completed before that same HARQ process is required for another new DL SPS transmission.

DL SPS HARQ process IDs are used for two purposes. First, the IDs could be used for reception of a new DL SPS transport block in subframes that are indicated as corresponding to new data transmissions based on the current DL SPS configuration. Here, the HARQ process ID is calculated implicitly according to the above equation. Second, the IDs could be used for reception of a DL SPS HARQ retransmission, dynamically scheduled on the PDCCH. Here, the HARQ process ID might need to be explicitly signaled over the air (but this HARQ process number signaling could occur in a semi-synchronous manner).

Semi-persistent scheduling is expected to be used for real-time services (e.g., voice) that may have limited delay tolerance. It may therefore be desirable for the DL SPS HARQ processes to be of the asynchronous type, with the non-SPS HARQ processes being semi-synchronously signaled, as described above.

If the DL SPS HARQ processes are completely asynchronous, then they can be signaled in the current manner (i.e., via a 3-bit HARQ process ID). Conversely, if the DL SPS HARQ processes are semi-synchronous in nature, there are at least three possible options for calculating the index of the appropriate DL SPS HARQ process to use for a new data transmission at a given subframe using the output of the above equation.

One option is to calculate the DL SPS HARQ process index based on the absolute process index value. That is, the output of the above equation directly specifies which HARQ process to use in the current subframe, even if that HARQ process is not semi-synchronously addressable in the current subframe. (This is achievable since the DL SPS HARQ process index for a new data transmission is calculated in a completely implicit manner at both the transmitter and receiver.) This would reserve a fixed set of HARQ processes for use by DL SPS in the same fashion as for the current LTE standard. For example, if three HARQ processes were reserved for DL SPS, these HARQ processes would have absolute indices of 0, 1, and 2. However, DL SPS HARQ retransmissions would only be able to occur in subframes where the particular HARQ process in question was semi-synchronously addressable. An alternative here would be to use either of the embodiments described above in order to asynchronously address DL SPS HARQ processes for retransmission purposes. This option may be the simplest approach.

Another option is to calculate the DL SPS HARQ process index based on the addressable value. That is, use the output of the above equation to map the resulting value to the final HARQ process index based on the semi-synchronous mapping function for the current subframe. Depending upon the mapping function being used and the configured SPS scheduling interval, the actual subset of HARQ processes being used for SPS may vary with time. For example, with three HARQ processes being reserved for DL SPS, the HARQ process indices would not necessarily just be restricted to 0, 1, and 2. Depending upon the configured semi-synchronous HARQ process mapping function pattern and the DL SPS scheduling interval, this approach may not guarantee that successive absolute HARQ process indices for DL SPS do not overlap. For example, the current equation may produce the output pattern: 0, 1, 2, 0, 1, 2, etc. However, when these values are passed through the semi-synchronous mapping function, the resulting absolute HARQ process indices might be: 0, 1, 0, 1, 0, 1, etc. Whether or not this situation arises is highly dependent upon the actual mapping function and DL SPS scheduling interval.

Another option is to derive a new method for ensuring that a non-repeating sequence of semi-synchronous HARQ processes equal in length to the "Number of Configured SPS Processes" parameter is obtainable. This may be difficult to do since the method would likely to be dependent upon the configured semi-synchronous HARQ mapping function, and a large number of potential mapping functions are available.

In an embodiment, a method of Hybrid Automatic Repeat Request (HARQ) retransmission is disclosed. The method comprises a user equipment (UE) receiving a first transport block associated with a first HARQ process and the UE identifying the first HARQ process based on an implicit parameter related to the first transport block and based on a first signaled HARQ process reference associated with the first transport block.

In another embodiment, a method of Hybrid Automatic Repeat Request (HARQ) retransmission is disclosed. The method comprises an access node (AN) transmitting a first transport block associated with a first HARQ process and the AN signaling an explicit HARQ process reference, wherein the first HARQ process is identified based on an implicit parameter associated with the first transport block and based on the explicit HARQ process reference.

In an embodiment, a user equipment (UE) is disclosed. The UE comprises a transceiver to receive a transport block, the transport block associated with a signaled hybrid automatic repeat request (HARQ) process reference and associated with an implicit parameter. The UE also comprises a processor to identify a first HARQ process based on the signaled HARQ process reference and based on the implicit parameter.

In an embodiment an access node (AN) is disclosed. The AN comprises a transceiver to transmit a transport block, the transport block associated with a first hybrid automatic repeat request (HARQ) process. The transceiver also signals a HARQ process reference, wherein the first HARQ process is identified by a combination of the HARQ process reference and by an implicit parameter associated with the transport block.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of Hybrid Automatic Repeat Request (HARQ) retransmission, comprising:
    a user equipment (UE) storing a mapping of HARQ process identities versus an implicit parameter and versus a signaled HARQ process reference, wherein the implicit parameter is based on a subframe number;
    the UE receiving a first transport block and a value of the signaled HARQ process reference associated with the first transport block, the first transport block being transmitted in a first carrier; and
    the UE identifying a first HARQ process based on a value of the implicit parameter related to the first transport block, the value of the signaled HARQ process reference, and the mapping.

2. The method of claim 1, wherein the implicit parameter is further based on a physical downlink control channel (PDCCH) on which a resource allocation information associated with the first transport block was received.

3. The method of claim 1, wherein the first signaled HARQ process reference is provided by a downlink control information (DCI) associated with the first transport block.

4. The method of claim 1, wherein the first HARQ process reference is signaled using a number of bits that is not sufficient to signal all HARQ processes available to the UE.

5. The method of claim 1, further comprising
    the UE receiving a second transport block associated with a second HARQ process; and
    the UE identifying the second HARQ process based on a second signaled HARQ process reference associated with the second transport block.

6. The method of claim 1, further comprising,
    the UE receiving a second transport block and a second value of the signaled HARQ process reference, the second transport block being transmitted in a second carrier; and
    the UE identifying a second HARQ process based on a second value of the implicit parameter related to the second transport block, the second value of the signaled HARQ process reference, and the mapping;
    wherein the first carrier is different from the second carrier and the first HARQ process is different from the second HARQ process even if the value of the implicit parameter is the same as the second value of the implicit parameter and the value of the signaled HARQ process reference is the same as the second value of the signaled HARQ process reference.

7. The method of claim 1, wherein the implicit parameter is the subframe number, and wherein the mapping is a table containing a HARQ process identity for each combination of values of subframe number and signaled HARQ process reference.

8. A method of Hybrid Automatic Repeat Request (HARQ) retransmission, comprising:
    an access node (AN) transmitting a mapping of HARQ process identities versus an implicit parameter and versus an HARQ process reference, wherein the implicit parameter is a subframe number;
    the AN transmitting a first transport block associated with a first HARQ process; and
    the AN signaling a value of an HARQ process reference associated with the first transport block, wherein the first HARQ process is identified based on a value of the implicit parameter associated with the first transport block, the value of the HARQ process reference, and the mapping.

9. The method of claim 8, wherein the signaled HARQ process reference is provided by a downlink control information (DCI) associated with the first transport block.

10. The method of claim 8, wherein the HARQ process reference is signaled using a number of bits that is not sufficient to signal all HARQ processes available to the UE.

11. The method of claim 8, further comprising,
    the AN transmitting a second transport block and a second signaled HARQ process, the second transport block being transmitted in a second carrier; and
    the AN signaling a second HARQ process based on a second value of the implicit parameter related to the second transport block and based on the second signaled HARQ process reference associated with the second transport block;
    wherein the first carrier is different from the second carrier and the first HARQ process is different from the second HARQ process even if the value of the implicit parameter is the same as the second value of the implicit parameter and the first signaled HARQ process reference is the same as the second HARQ process reference.

12. A user equipment (UE), comprising:
    a memory to store a mapping of hybrid automatic repeat request (HARQ) process identities versus an implicit parameter and versus a signaled HARQ process reference, wherein the implicit parameter is based on a subframe number;
    a transceiver to receive a transport block, the transport block associated with a value of the signaled HARQ process reference; and
    a processor to identify a HARQ process based on the value of the signaled HARQ process reference, a value of the implicit parameter, and the mapping.

13. The UE of claim 12, wherein the implicit parameter is further based on a physical downlink control channel (PDCCH) on which a resource allocation information associated with the first transport block was received.

14. The UE of claim 12, wherein the signaled HARQ process reference is provided by a downlink control information (DCI) associated with the transport block.

15. The UE of claim 12, wherein the HARQ process reference is signaled using a number of bits that is not enough to signal every HARQ processes available to the UE.

16. An access node (AN), comprising:
    a transceiver to transmit a mapping of hybrid automatic repeat request (HARQ) process identities versus an implicit parameter and versus an HARQ process reference, wherein the implicit parameter is a subframe number, to transmit a transport block, the transport block associated with a first HARQ process, and to signal a value of a HARQ process reference associated with the transport block, wherein the first HARQ process is identified by a combination of the value of the HARQ process reference, a value of the implicit parameter associated with the transport block, and the mapping.

17. The AN of claim 16, wherein the HARQ process reference is signaled in a downlink control information (DCI) associated with the transport block.

18. The AN of claim 16, wherein the transceiver transmits the mapping to a first user equipment (UE) and transmits a second mapping of HARQ process identities versus the HARQ process reference and the implicit parameter to a second UE.

19. The AN of claim 18, wherein the mapping is different from the second mapping.

20. The AN of claim 16, further comprising,
the AN transmitting a second transport block and a second signaled HARQ process, the second transport block being transmitted in a second carrier; and
the AN signaling a second HARQ process based on a second value of the implicit parameter related to the second transport block and based on the second signaled HARQ process reference associated with the second transport block;
wherein the first carrier is different from the second carrier and the first HARQ process is different from the second HARQ process even if the value of the implicit parameter is the same as the second value of the implicit parameter and the first signaled HARQ process reference is the same as the second HARQ process reference.

* * * * *